April 12, 1966  I. SWIRE  3,245,628
MOVING PICTURE PROJECTOR REEL DEVICE
Filed March 2, 1964  4 Sheets-Sheet 1

INVENTOR.
IRVING SWIRE
BY
ATTORNEYS

April 12, 1966  I. SWIRE  3,245,628

MOVING PICTURE PROJECTOR REEL DEVICE

Filed March 2, 1964  4 Sheets-Sheet 2

INVENTOR.
IRVING SWIRE
BY
Briskin & Goldfarb
ATTORNEYS

April 12, 1966  I. SWIRE  3,245,628
MOVING PICTURE PROJECTOR REEL DEVICE
Filed March 2, 1964  4 Sheets-Sheet 3

INVENTOR.
IRVING SWIRE
BY
ATTORNEYS

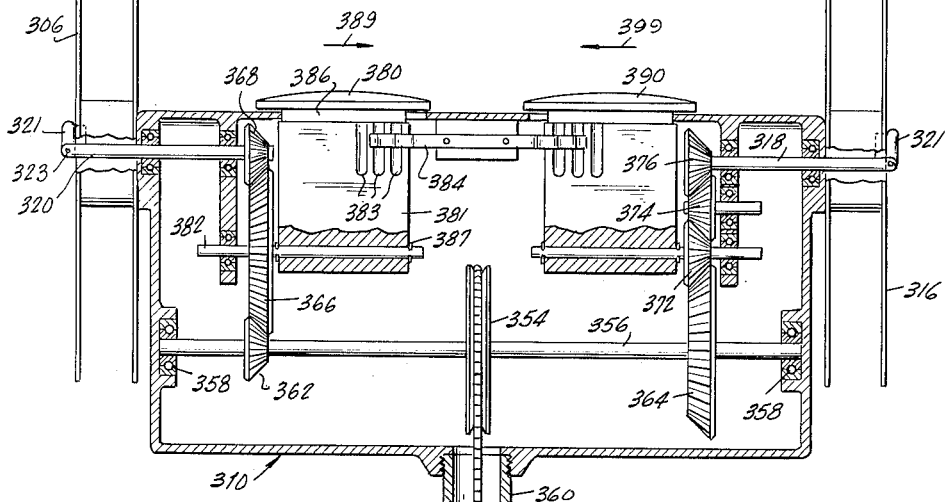
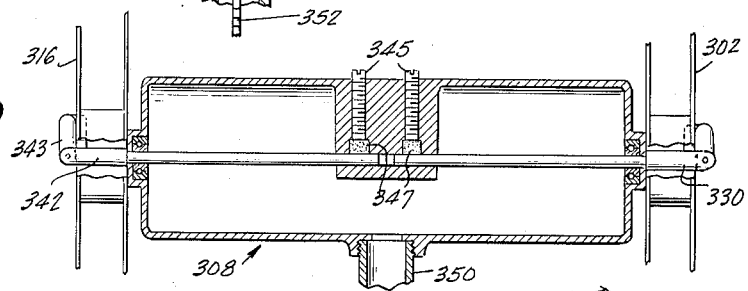
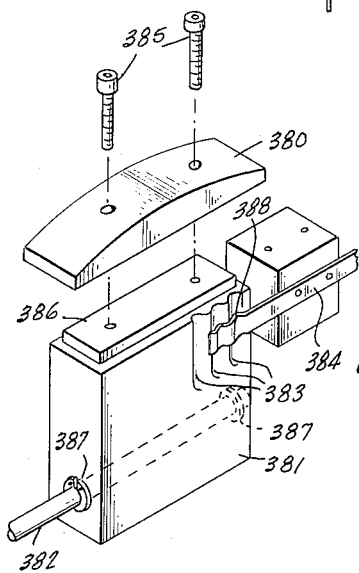
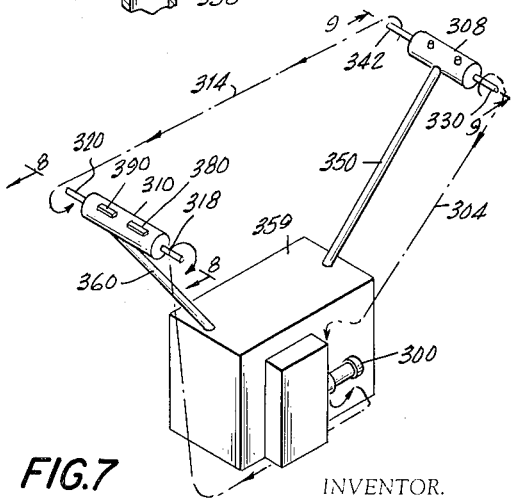

United States Patent Office 3,245,628
Patented Apr. 12, 1966

3,245,628
MOVING PICTURE PROJECTOR REEL DEVICE
Irving Swire, 244 Fountain Road, Englewood, N.J.
Filed Mar. 2, 1964, Ser. No. 348,368
13 Claims. (Cl. 242—55.12)

This invention relates to a motion picture projection reel device, and more particularly to film-winding and rewinding apparatus for a motion picture projector which apparatus simultaneously rewinds motion picture film at a more rapid rate while another film is being projected at a normal rate.

Heretofore, in conventional types of motion picture projectors, especially 8 mm. and 16 mm. film projectors for home use, the necessary step of rewinding a film after it has been projected for a viewing is customarily preformed subsequent to the viewing operation, requiring additional time and occupying the projector while the audience must wait for the rewind operation to be completed before viewing another reel of film.

It is therefore an object of my invention to provide a mechanism which will enable the operator to conveniently rewind a previously projected film simultaneously with the projection of another.

Another object of the invention is to provide simple and efficient means for obviating the necessity of resorting to an additional time-consuming operation to rewind motion picture film after it has been projected for viewing and before another film can be projected.

A further object of the invention is to provide a rewinding apparatus in a motion picture projector which rewinds film at a greater speed simultaneously with the film being projected.

Another object of the invention is to provide a film-winding and rewinding device in which a plurality of supply reels and a plurality of take-up reels may be mounted on respective spindles, with different take-up reels being independently driven at respectively different times and rates in opposite directions of rotation.

Still another object of the invention is to provide control means for engaging and disengaging the drive of the film being viewed so that the latter can be stopped at will to view independent frames, without affecting the continuity of the rewinding of a film which had already previously been projected.

Still further objects and features of the invention reside in the provision of a film-winding and rewinding device which is simple in construction, compact and attractive in appearance, which is capable of being manufactured by mass production methods and easily mounted in, on, or closely associated with the housing of a motion picture projector.

To these ends, and in accordance with an illustrative embodiment of the invention, the motion picture projector is provided with two sets of spindles, namely a supply reel spindle and a take-up reel spindle. The take-up spindle comprises two coaxial sleeves or shaft portions, one shaft portion being adapted to drivingly support a take-up reel for the film being projected, and the other shaft portion being rotatable at a higher speed in a direction opposite to the first shaft portion, and drivingly supporting the take-up reel for the film being rewound. The rewinding operation thus takes place at a more rapid rate in the opposite rotary direction, for example counter-clockwise, and faster than the winding rate of the film simultaneously being wound, for example clockwise, onto the take-up reel winding the film being projected.

According to a further feature of the invention, the two shaft portions of the take-up spindle are mutually arranged so that one shaft portion is hollow, while the other shaft portion, which supports the rewind take-up reel, has a shaft extension which extends through the hollow sleeve of the first shaft portion. This provides for a compact side-by-side spindle or reel arrangement, the shaft portions being driven from a common drive motor, although independently.

According to another embodiment of the invention, instead of the shaft portions being coaxial and joined, the take-up shafts for the winding and rewinding project respectively from opposite sides of a take-up drive housing. Both of the spindle shafts in this embodiment are driven from a common drive shaft, in turn driven by a conventional spring belt connected to a variable speed electric motor. In this embodiment two thumb-slide blocks are provided, each for engaging and disengaging one of two respective gears to drive or disconnect one of the take-up spindle shafts. The gears from the common drive shaft to the rewind spindle shaft are of such relative size that the rewind spindle shaft rotates at a greater speed and in the opposite direction as compared to the winding spindle shaft.

Other features of the invention include friction means for restraining the free rotation of the respective supply reels on a multiple-part supply reel spindle, novel detents and reel-securing means for disengagable keying the reel to the spindle shafts, a screwable clutch engaging knob for engaging and disengaging a clutch to selectively and independently drive the rapid rewind take-up reel shaft portion, and an axially displaceable multiple-position shaft and bevel gear thereon which makes it possible to disengage the drive to the film being projected while continuing to drive the rewind take-up reel at a higher rate through a clutch, which clutch can be disengaged if desired.

These, together with various ancillary objects, features and advantages of the invention will become more apparent as the following description proceeds and are attained by the novel film-winding and rewinding apparatus according to the invention, preferred embodiments of which have been illustrated in the accompanying drawings, by way of example only, wherein:

FIG. 7 is a perspective view of a projector incorporating a further embodiment of the invention;

FIG. 8 is a sectional view, partially cut away, taken along line 8—8 of FIG. 7;

FIG. 9 is a sectional view taken along line 9—9 of FIG. 7; and

FIG. 10 is a perspective view of a detail of FIG. 8.

The same reference numerals designate the same or functionally similar parts throughout the several views.

Figure 2:
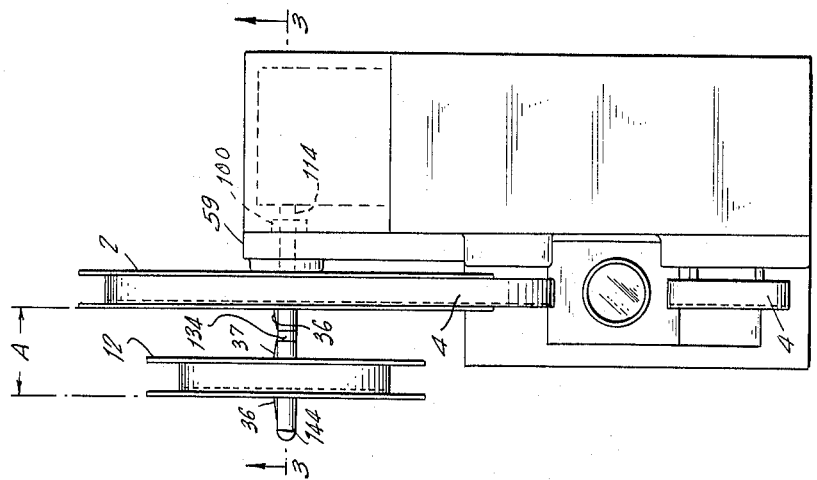
FIG. 2 is a front elevation view of the projector of FIG. 1.
Figure 1:
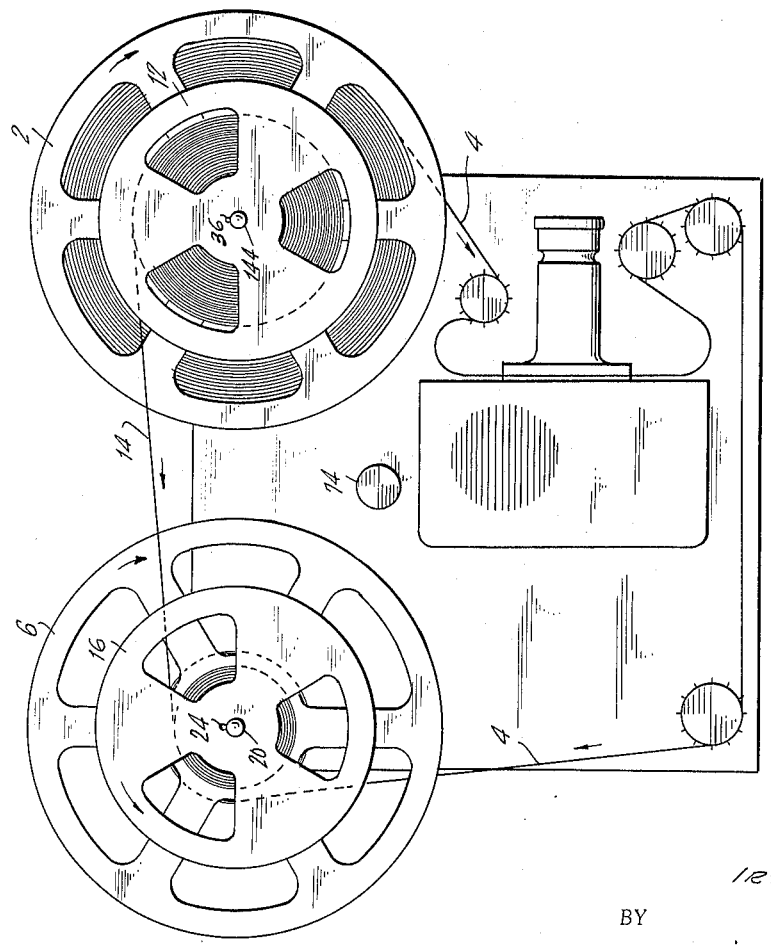
FIG. 1 is a side elevation view of a motion picture projector provided with film-winding and rewinding apparatus according to the invention, the rewinding supply and take-up reels being illustrated smaller in diameter than the viewing film supply and take-up reels only for the purposes of clarity of illustration.
Figure 3:
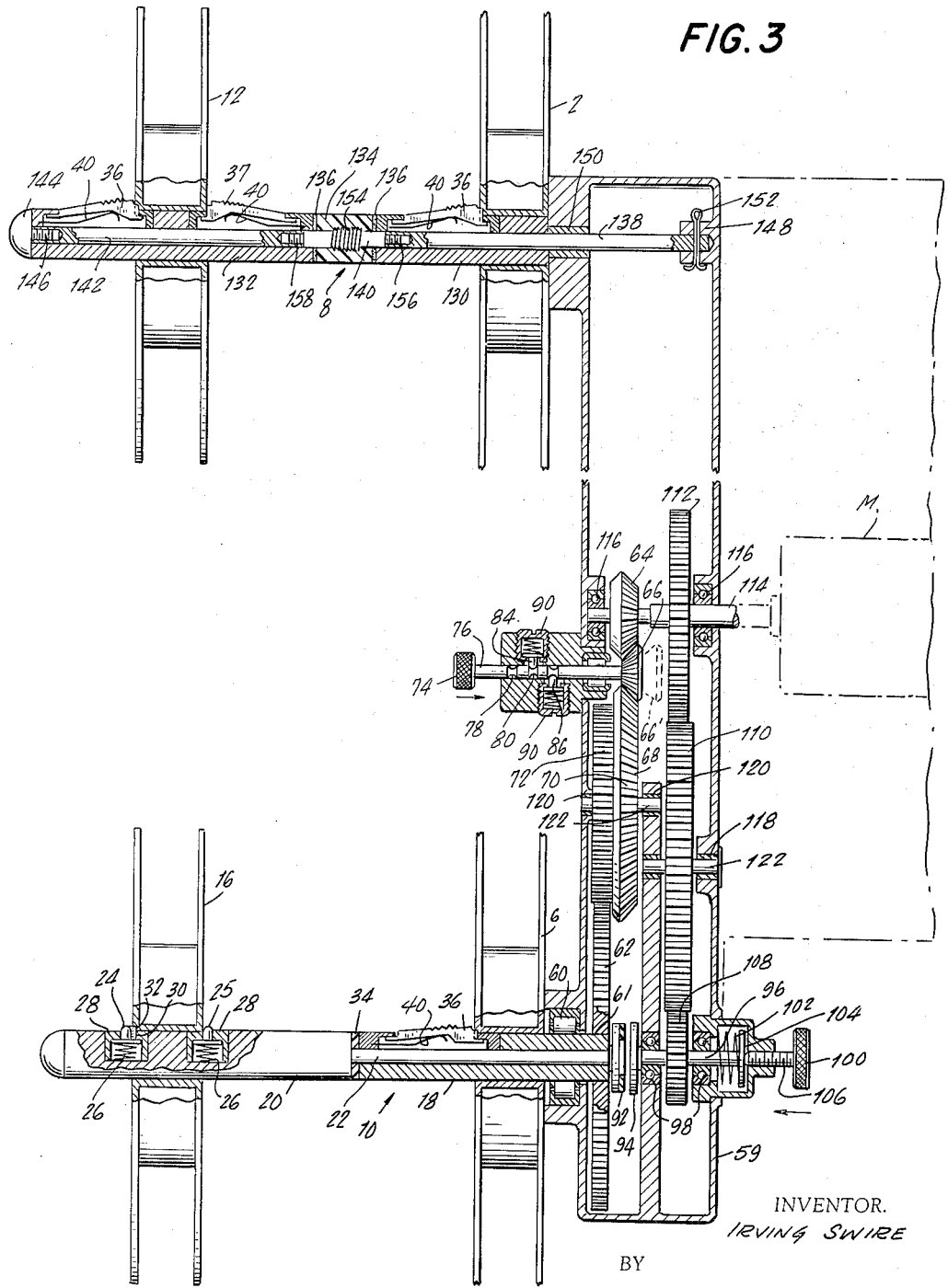
FIG. 3 is a view, partially in section, taken along the line 3—3 of FIG. 2.

In FIGS. 1–3, there is shown a supply reel 2 for film 4 to be projected, and a take-up reel 6 for winding up the same film travelling in the direction indicated by the arrows. The supply reel 2 is supported on a supply reel spindle generally designated by the numeral 8, and the take-up reel 6 is supported on and rotatable by a take-up spindle generally designated by the numeral 10. Also supported on the spindle 8 is a supply reel 12 for film 14 which has already been projected, and which is to be rewound on a rewind take-up reel 16, supported on spindle 10. The take-up spindle 10 is constructed in two parts so that the take-up reel 16 rotates at a faster rate, preferably about 4 times as fast, as the wind-up take-up spindle 6. The take-up reel spindle 10 comprises two shaft portions, namely a hollow shaft portion 18 and an extended shaft portion 20 which has attached thereto an extension 22 extending through and rotatable independently of the hollow shaft portion 18. The spindle portion 20 has mounted therein two spring buttons 24, 25, outwardly pressed radially by means of compression springs 26, 26 and retained in the shaft 20 by means of cap inserts 28, 28. The button 24 is provided with an outwardly protruding key 30 which engages a keyway 32 of reel 16 when the button 24 is in outwardly pressed position and the reel 16 is in the proper peripheral position on the spindle portion 20. The spindle portion 20 is separated from the hollow spindle portion 18 by a self-lubricating washer 34, made for example out of nylon, Teflon or polystyrene.

Because of the limited thickness of the wall of hollow spindle 18, instead of using spring-pressed buttons such as 24, 25, a special locking detent 36 is provided to key the take-up spindle 6 to the hollow shaft 18.

Figures 4, 5, 6:
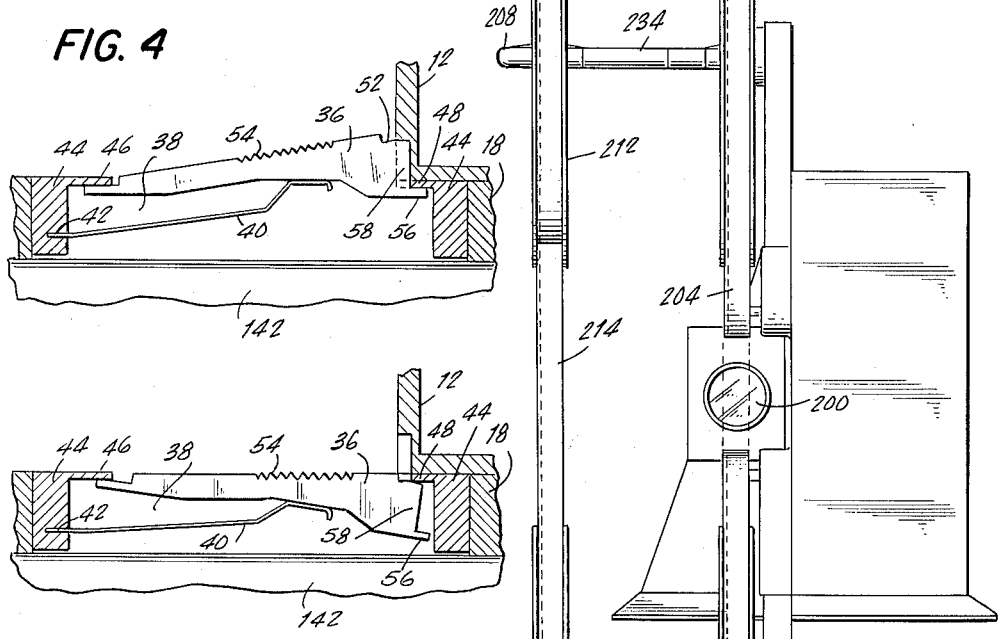
FIG. 4 is a detail of a reel-locking detent of FIG. 3, shown in raised position.
FIG. 5 is a view of the device of FIG. 4, shown in another position thereof.
FIG. 6 is a front view of a projector illustrating another embodiment of the apparatus of FIGS. 1–3, wherein the supply and take-up spindles are respectively above and below the lens of the projector.

As best shown in FIGS. 4 and 5, the detent 36 nests within the hollowed-out portion 38 of the wall of hollow shaft 18. A flat leaf spring 40 has one end thereof nesting within a recess 42 of an insert 44 which frames the cavity 38 and forms lips 46 and 48 extending inwardly from the walls of the opening. One notched end 50 of the detent 36 rests beneath the extension 46, and the other notched end 52 rests beneath the extension 48 when the detent 36 is in lowered position. Serrations 54 are provided along the middle portion of the detent 36 for thumb manipulation of the detent from the position of FIG. 4 to the position of FIG. 5, and vice versa. When the detent 36 is manually pulled toward the left relative to FIGS. 4 or 5, the leaf spring 40 presses the detent 36 upwardly into the position of FIG. 4, and the foot projection 56 at the bottom right end of the detent 36 is retained by the lip 48, while a key projection 58 engages a corresponding keyway in the side of the reel 6. In the position of FIG. 4, the detent 36 is in raised position to key the take-up spool to the hollow spindle portion 18 so as to rotate together therewith. In the position of FIG. 5, the detent 36 is in lowered position so that the reel 6 can be easily slid onto or off the spindle portions 20, 18 of the spindle 10. A detent 37, similar to detent 36 but without the key 58, is provided on the opposite side of a respective reel where no additional key is necessary.

A roller bearing 60 is provided in the housing 59 of the projector for rotatably supporting the overhung spindle portion 18, and thus also the extensions 22, 20. One end of the hollow spindle 18 is fixedly joined at 61 to a spur gear 62, driven from a variable-speed motor M through a gear train comprising bevel gears 64, 66 and composite gear 68. Composite gear 68 has two sets of teeth, namely bevel teeth 70 and straight cylindrical teeth 72, the straight gear teeth 72 meshing with the teeth of gear 62 and driving the latter when the bevel gear 66 is in the position shown in solid lines in FIG. 3. The bevel gear 66 is axially shiftable from the illustrated engaged solid line position 66 to the dotted line disengaged position 66' by means of a control push button 74 which is fixed to a shaft 76 provided with three peripheral grooves 78, 80, 82. Two spring-pressed buttons 84, 86 retained in the housing portion 88 by means of threaded caps 90, 90 simultaneously engage two of the three grooves 78, 80, 82 of the shaft 76. Thus, in the illustrated position the spring-biased buttons 84, 86 engage the grooves 80 and 82 to retain the bevel gear 66 in mesh with the bevel gear teeth 64 and 70. When the control button 74 is pressed to the right relative to FIG. 3, the bevel gear 66 is shifted to the dotted-line position 66' and the spring buttons 84 and 86 respectively engage the grooves 78 and 80. This disconnects the drive motor M from the gear train 68, 62 and stops the drive of hollow spindle portion 18 and consequently of wind-up reel 6 mounted thereon. This is desirable when the film being projected is to be stopped for viewing of a single frame. If desired, a friction disk (not illustrated) may be provided to stop coasting rotation of the gear wheel 68, the friction disk to be actuated only when the bevel gear 66 is moved into the position 66'.

The spindle portion 20 is driven independently of and faster than the spindle portion 18 as follows. The extension 22 of spindle portion 20 has a friction clutch face 92 fixedly mounted at its drive-engaging end. The plate 94 of the clutch 92, 94 is shiftable into and out of engaging position with the clutch face 92 by means of an axially shiftable shaft 96 journalled in the housing 9 by means of bearings 98 and coaxial with the shaft extension 22. For axially shifting the clutch plate 94 into and out of engaging position, there is provided a screwable clutch-engaging knob 100, spring-pressed outwardly by means of a spring 102 which engages a collar disk 104 fixed to the shaft 96. Threads 106 on the shaft 96 engage corresponding threads in the housing 59 to keep the knob 100 and its corresponding shaft 96 in a selected axial position. Fixedly mounted on the clutch shaft 96 is a pinion gear 108 which meshes with an intermediate spur gear 110 in all positions of the knob 100 and of clutch plate 94. Intermediate spur gear 110 is driven from motor M by means of another spur gear 112 mounted, in addition to bevel gear 64, on the drive shaft 114 of motor M.

The ratio of the gear train 64–66–70–72–62 to the gear train 112–110–108 is preferably 1 to 4, so that the rewind spindle portion 20 will rotate at approximately four times the rate of the hollow spindle portion 18. This is desirable for the following reason. In 8 mm. film for example, the smallest conventional reel contains 50 feet of film, while the largest conventional reel holds 200 feet of film. Similarly, in 16 mm. film, the smallest conventional reel holds 100 feet of film and the largest holds 400 feet of film. Therefore, with a ratio of 4 to 1, the length of time required for rewinding the largest reel of film will be the same as that for simultaneously projecting the smallest reel of film. Thus, no time need be lost for waiting for a film to be rewound, or tying up the projector before it can be used for projecting another film.

Ball bearings 116 are provided in the housing 59 for journalling the shaft 114, and suitable other bearings 118, 118 and 120, 120 are provided for journalling respective axles 122 and 124 of the respective gears 110 and 68.

A C-washer, nesting in a corresponding groove in shaft extension 22 and located between the lateral face of gear 62 and the clutch disk 92, prevents axial shifting of the shaft extension portion 22 relative to the outer hollow shaft 18.

The supply reel spindle 8 will now be described. The spindle 8 comprises two sleeve portions 130 and 132 which respectively support and permit constrained rotation of the projection film supply reel 2 and the rewind film supply reel 12. The sleeves 130 and 132 are both hollow and are separated by a spacer sleeve 134, preferably made of plastic, such as nylon or polystyrene. The sleeves 130, 132 are each separated from the intermediate spacer sleeve 134 by means of felt friction washers 136 which constrainedly control the freedom of rotation of sleeves 130 and 132 relative to sleeve 134 by the tightness with which the three sleeves are pressed together. A three-part supporting rod 138, 140, 142 supports the three sleeves 130, 134, 132. A cap or hub 144 having a threaded stud 146 is threaded into and closes off the free end of the rod 142 and of sleeve 132. The rod portion 138 is mounted in the housing 59 by means of supporting journals 148, 150 and maintained free of rotation and axial movement by means of a cotter pin 152 fastened through support journal 148. The intermediate rod portion 140 is provided with self-locking threads 154 to adjustably fix it into the plastic sleeve 134. Male threads are provided at the respective ends 156, 158 of the intermediate rod portion 140 to engage corresponding threaded female sockets in the rod portions 138 and 142. A plurality of detent assemblies 36, 37 with corresponding leaf springs 40 are provided in the walls of the hollow sleeves 130 and 132 for axially holding the respective supply reels 2 and 12 on the sleeves 130 and 132 for rotation therewith.

Tightening of the spacer 134 on threads 154 compresses the right-hand felt washer 136 and increases the friction between sleeve 130 and intermediate sleeve 134, which is fixed on rod 140 and rod 138, the latter being non-rotatably fixed in the housing 59. Thus, the viewing film 4 is pulled through the projection apparatus by rotation of the take-up reel 6 and of the conventional drive sprockets, the reel 2 rotating together with sleeve 130 on shaft portion 138, the freedom of rotation of reel 2 being adjustable, as mentioned, by rotation of spacer 134 on threads 154. The rewind supply reel 12 constrainedly rotates together with sleeve 132 on rod portion 142, with the freedom of rotation of reel 12 being adjustable by tightening or loosening the threads 146 of hub 144, thereby increasing the friction between sleeves 132 and 134 against the left-hand felt washer 136. The reason for retarding the freedom of rotation of supply reels 2 and 12 with their respective sleeve portions is to prevent the respective supply reels from unwinding faster than the respective films 4 and 14 are being wound up on the shaft 10. Thus, the sleeves 132 and 130 can rotate at different speeds in opposite rotary directions relative to one another.

As stated, rapid rewind take-up reel 16 rotates in the opposite direction from projection film take-up reel 6, and correspondingly the rewind supply reel 12 rotates in the opposite direction from supply reel 2. The reason for this is to make possible the winding and rewinding of the film with the emulsion side of the film always being in the same relative position, and so that both of the take-up reels can be on the same spindle, while both of the supply reels are on the same respective spindle.

In the embodiment of FIG. 6 there is illustrated a motion picture projector in which the film 204 is being projected through the lens 200, and a take-up spindle 210 is located below the lens. The supply reel 202 feeds the film 204 being projected through the lens 200 to the projection film take-up reel 206 mounted on spindle 210. Simultaneously, the film being rewound is supplied from the rewind film supply reel 212 to wind the film 214 onto the rewind take-up reel 216 independently driven on a separate portion of spindle 210. In contrast to the embodiment of FIGS. 1–3, the supply spindle 208 is located above the lens, and the take-up spindle 210 is located below the lens. The drive and other parts for the portions of the spindle 210 and 208 are similar to those described above in connection with FIGS. 1–5. However, intermediate spacer sleeves 234 and 235 are provided respectively on spindles 208 and 210 in order to determine the length of space B, which is required to maintain the film 214 a sufficient distance away from the vertical axis of the lens 200 so that film 214 will not obstruct the outwardly flaring path of light passing perpendicular to the plane of the illustration through the lens 200 to the viewing screen. The length of the sleeves 234 and 235 will depend upon the width of the angle of projection of the lens 200.

In the embodiment of FIGS. 8–10, and as best shown in overall perspective view in FIG. 7, the supply spindles 330 and 342 are mounted in and driven from a supply spindle housing 308, supported on a pipe 350 from the projector housing 359. Similarly, the respective drive spindles 318 and 320 are supported and driven from a take-up spindle housing 310, mounted on a pipe 360 similarly supported from the housing 359. The film 304 being projected is unwound from the supply reel 302, passes through the lens 309 and is wound up on the take-up reel 306 keyed to the shaft 318. The film 314 simultaneously being rewound at a greater speed is fed from rewind film supply reel 312 keyed to shaft 342 and travels to rapid rewind take-up reel 316 keyed to shaft 320.

FIG. 8 illustrates in detail the mechanism of the take-up drive spindle housing 310. A spring belt 352, driven from a conventional variable speed motor in the projector housing, turns the pulley 354 fixed to the common drive shaft 356, which is journalled by means of ball bearings 358, 358 in the housing 310. Fixed to the shaft 356 at different sides of pulley 354 are a small bevel gear 362 and a larger bevel gear 364. Driven by the pinion bevel gear 362 is a bevel gear 366, shown in FIG. 8 in engaged position. The bevel gear 366 in turn drives another bevel gear 368, which is fixed to the projection film take-up reel shaft 320, thus driven by gear train 362, 366, 368. A pivoted key 321 hingedly mounted in a slot at the end of shaft 320 and fixed by a transverse pivot pin 323 serves as a movable key for laterally and rotatably fixing the reel 306 to the shaft 320. The rapid rewind take-up reel 316 is driven from bevel gear 364 through a separate train of bevel gears 364, 372, 374, 376, the latter gear being fixedly mounted on take-up reel drive shaft 318, which rotates in the opposite rotational direction from shaft 320.

The bevel gears 366 and 372 are each independently disengageable from their respective gear trains by means of thumb slides 380 and 390, respectively. As best shown in FIG. 10, the thumb slide 380 is fastened by means of screws 385 through a slide plate 386 to a plastic movable block 381, which is provided with a plurality of vertical grooves 383. A spring steel-locking member 384, fixedly mounted by rivets or screws to the housing 310, is formed with a plurality of V-shaped projections 388 contoured to simultaneously engage an alternate group of two of the three grooves 383 in the block 381. The shaft 382 on which gear 366 is mounted is axially fixed in the block 381 by means of C-shaped washers 387 which fit into spaced radial grooves in the shaft 382.

Movement of the thumb slide 380 in the direction of the arrow 389 (FIG. 8) slides the plastic block 381 laterally until the V-shaped projections 383 of the spring member 384 engage an alternate group of two of the grooves 383, thus locking the plastic block into a position to the right of that shown in FIG. 8 and disengaging the bevel gear 366 from gears 362 and 368, and consequently disengaging the drive of common drive shaft 356 from spindle shaft 320, to stop rotation of the projection film take-up reel 306.

Thumb slide 390, when moved in direction of arrow 399 similarly disengages the bevel gear 372 from drive gear 364 and bevel gear 374 to stop the drive rotation of rapid rewinding spindle 318 and its corresponding rewind take-up reel 316. Thumb slide 390 thus independently engages or disengages the drive shaft 356 from rapid rewind take-up reel 316 regardless of whether or not film is being projected or supplied from reel 316.

As shown in FIG. 9, the housing 308 for the supply reel spindles 342 and 330 is mounted on a pipe 360, fastened to the housing 359. A pair of stud screws 345 engaging felt pads 347 which press with selectively variable pressure against spindles 342 and 330, respectively, control the friction pressure against the respective spindles 342, 330. Pivotable keys 343, similar in operation to the above-described keys 321, temporarily fix the supply reels 316 and 302 laterally and rotationally to their respective shafts 342 and 330. The screws 345 thus make it possible to adjust the pressure on the free spinning spindles 342 and 330 to prevent too rapid unwinding or spilling of the film off of the supply reels 302 and 316.

From the foregoing it is apparent that the various illustrated and described embodiments permit the independent rewinding of motion picture film at a more rapid speed and simultaneously with another film which is being projected, so that the projector apparatus need not be tied up waiting for a film to be rewound when it is needed for projecting. The expressions: gears, gear means, gear trains and transmission means, as used herein, include friction wheels as well as toothed gears.

It should be understood, of course, that the foregoing disclosure relates to only preferred embodiments of the invention and that it is intended to cover all changes and modifications of the examples of the invention herein chosen for the purpose of the disclosure, which do not constitute departures from the spirit and scope of the invention as set forth in the appended claims.

I claim:

1. Motion picture projector film-winding and reeling apparatus, comprising first spindle means for rotatably supporting a viewing film supply reel and a rewind film supply reel, second spindle means spaced from and parallel to said first spindle means, said second spindle means having individual shaft portions for drivingly supporting respectively a viewing film take-up reel and a rewind film take-up reel, drive means for independently simultaneously rotating said shaft portions at mutually different speeds and in mutually opposite rotational directions, and engaging means for selectively and separately engaging and disengaging said respective shaft portions from said drive means.

2. Motion picture projector film-winding and reeling apparatus, comprising a housing, first spindle means supported by said housing for rotatably supporting a viewing film supply reel and a rewind film supply reel, second spindle means supported by said housing and spaced from and parallel to said first spindle means, said second spindle means having individual shaft portions for drivingly supporting respectively a viewing film take-up reel and a rewind film take-up reel, drive means for independently simultaneously rotating said shaft portions at mutually different speeds and in mutually opposite rotational directions, and engaging means for selectively and separately engaging and disengaging said respective shaft portions from said drive means, one of said shaft portions being coaxially mounted adjacent and rotatably supported by the other of said shaft portions, and detent means within each of said shaft portions for temporarily selectively laterally and rotationally fixing and releasing one of said reels on a corresponding shaft portion.

3. Motion picture projector film-winding apparatus, comprising first spindle means for rotatably supporting a viewing film supply reel and a rewind film supply reel, second spindle means spaced from and parallel to said first spindle means, said second spindle means having individual shaft portions for drivingly supporting respectively a viewing film take-up reel and a rewind film take-up reel, drive means for independently simultaneously rotating said shaft portions at mutually different speeds and in mutually opposite rotational directions, and engaging means for selectively and separately engaging and disengaging said respective shaft portions from said drive means, one of said individual shaft portions comprising a hollow sleeve, the other of said shaft portions being coaxial with said hollow sleeve and having a shaft extension extending through said sleeve, and bearing means at one end of said hollow sleeve for rotatably supporting said hollow sleeve and said shaft extension.

4. Apparatus according to claim 3, said engaging means including a clutch face fixedly connected to said shaft extension, a clutch shaft having a clutch plate mounted coaxial with and adjustably spaced from said clutch face for engaging the latter, a gear fixed on said clutch shaft, and clutch engaging means for axially shifting said clutch shaft and clutch plate selectively into a plurality of positions, said drive means including gear means meshable with said gear on said clutch shaft in each of said positions of said clutch shaft and clutch plate.

5. Apparatus according to claim 3, said drive means including a gear train operably connected to one of said shaft portions, said engaging means including one gear of said gear train, an axially shiftable control shaft having radial grooves and being axially fixed at one end to said one gear, journal means mounting said control shaft for axial movement into a plurality of selected positions, and retaining means radially biased and engaging said grooves for retaining said control shaft in each of said selected positions, said one gear in one of said positions being in driving mesh within said gear train.

6. Apparatus according to claim 3, said drive means including a gear train operably connected to one of said shaft portions, said engaging means including one gear of said gear train, an axially shiftable control shaft having radial grooves and being axially fixed at one end to said one gear, journal means mounting said control shaft for axial movement into a plurality of selected positions, and retaining means radially biased and engaging said grooves for retaining said control shaft in each of said selected positions, said one gear in one of said positions being in driving mesh within said gear train, and manual means for axially shifting said control shaft.

7. Apparatus according to claim 6, said gear train further including a first gear mounted on said hollow sleeve, a composite gear having cylindrically arranged straight teeth meshing with said first gear and bevel teeth meshable with said axially shiftable one gear, and a bevel driving gear meshable with said one gear.

8. Motion picture projector film-winding and reeling apparatus, comprising first spindle means for rotatably supporting a viewing film supply reel and a rewind film supply reel, second spindle means spaced from and parallel to said first spindle means, said second spindle means having individual shaft portions for drivingly supporting respectively a viewing film take-up reel and a rewind film take-up reel, drive means for independently simultaneously rotating said shaft portions at mutually different speeds and in mutually opposite rotational directions, and engaging means for selectively and separately engaging and disengaging said respective shaft portions from said drive means, a take-up drive housing, said individual shaft portions projecting from mutually opposite sides of said take-up drive housing, said drive means including a common drive shaft rotatably journalled in said take-up drive housing and two separate transmission trains operably connecting said common drive shaft to said respective individual shaft portions, a slide block slidably supported by said drive housing for displacement into a plurality of positions and having a slide block shaft axially fixed and rotatably mounted in said block for axial movement with the latter, a slide block gear forming part of one of said transmission trains and fixed to one end of said slide block shaft, said slide block being provided with a plurality of vertical grooves in one face thereof, and projecting means mounted in said take-up drive housing and selectively engageable with alternate ones of said grooves in respectively different positions of said slide block for temporarily fixing said slide block and slide block shaft in a respective selected one of said positions, and manual means for selectively shifting said slide block in the axial direction of said slide block shaft.

9. Apparatus according to claim 8, and further including a supply reel spindle housing, said first spindle means comprising two individual spindles mounted at opposite sides of said supply reel spindle housing, screw means threadedly mounted in said housing and radially adjustable relative to at least one of said spindles, and compressible means between said screw means and said one spindle for adjustably varying the friction and thus the freedom of rotation of said one spindle.

10. Motion picture projector film-winding and reeling apparatus, comprising a housing, multiple-part first spindle means supported by said housing for rotatably supporting a viewing film supply reel and a rewind film supply reel, second spindle means supported by said housing and spaced from and parallel to said first spindle means, said second spindle means having individual shaft portions for drivingly supporting respectively a viewing film take-up reel and a rewind film take-up reel, drive means for independently simultaneously rotating said shaft portions at mutually different speeds and in mutually opposite rotational directions, and engaging means for selectively and separately engaging and disengaging said respective shaft portions from said drive means, at least some of the parts of said first spindle means being hollow coaxially arranged cylinders, multiple-part rod means extending through said cylinders and supported by said housing, friction means between said cylinders, and means for axially tightening said cylinders along said rod means and against said friction means for controlling the freedom of rotation of said cylinders on said rod means.

11. Motion picture projector film-winding and reeling apparatus, comprising a housing, first spindle means supported by said housing for rotatably supporting a viewing film supply reel and a rewind film supply reel, second spindle means supported by said housing and spaced from and parallel to said first spindle means, said second spindle means having individual shaft portions for drivingly supporting respectively, a viewing film take-up reel and a rewind film take-up reel, drive means for independently simultaneously rotating said shaft portions at mutually different speeds and in mutually opposite rotational directions, and engaging means for selectively and separtely engaging and disengaging said respective shaft portions from said drive means, one of said shaft portions being coaxially mounted adjacent and rotatably supported by the other of said shaft portions, and detent means within each of said shaft portions for temporarily selectively laterally and rotationally fixing and releasing one of said reels on a corresponding shaft portion, said detent means comprising means forming a cavity open radially outwardly in one wall of a respective shaft portion, said last-named means having lip portions partially overlapping said cavity, a radially movable and axially slidable detent member having one end slidably retained in said cavity against one of said lip portions and having a notch and extended reel-engaging key portion formed in its other end, said notch and key portion being movable into and out of said cavity in respective radially extended and withdrawn positions of said detent member, spring means mounted within said cavity and engageable with said detent member for urging the latter radially out of said cavity, said member having a foot extension on said other end thereof and engageable with said other lip portion in said radially extended position of said member for limiting the radial movement of the latter.

12. Motion picture projector film-winding and reeling apparatus, comprising a housing, first spindle means supported by said housing for rotatably supporting a viewing film supply reel and a rewind film supply reel, second spindle means supported by said housing and spaced from and parallel to said first spindle means, said second spindle means having individual shaft portions for drivingly supporting respectively a viewing film take-up reel and a rewind film take-up reel, drive means for independently simultaneously rotating said shaft portions at mutually different speeds and in mutually opposite rotational directions, and engaging means for selectively and separately engaging and disengaging said respective shaft portions from said drive means, one of said shaft portions being coaxially mounted adjacent and rotatably supported by the other of said shaft portions, and detent means within each of said shaft portions for temporarily selectively laterally fixing and releasing one of said reels on a corresponding shaft portion, said detent means comprising means forming a cavity open radially outwardly in one wall of a respective shaft portion, said last-named means having lip portions partially overlapping said cavity, a radially movable and axially slidable detent member having one end slidably retained in said cavity against one of said lip portions and having a notch formed in its other end, said notch being movable into and out of said cavity in respective radially extended and withdrawn positions of said detent member, spring means mounted within said cavity and engageable with said detent member for urging the latter radially out of said cavity, said member having a foot extension on said other end thereof and engageable with said other lip portion in said radially extended position of said member for limiting the radial movement of the latter, said member in said withdrawn position nesting wholly within said cavity.

13. Motion picture projector film-winding and reeling apparatus, comprising first spindle means for rotatably supporting a viewing film supply reel and a rewind film supply reel, second spindle means spaced from and parallel to said first spindle means, said second spindle means having individual shaft portions for drivingly supporting respectively a viewing film take-up reel and a rewind film take-up reel, drive means for independently simultaneously rotating said shaft portions at mutually different speeds and in mutually opposite rotational directions, and engaging means for selectively and separately engaging and disengaging said respective shaft portions from said drive means, said projector being equipped with a lens, one of said first and second spindle means being respectively located above and below said lens, said first and second spindle means each comprising a plurality of portions, and spacer sleeves forming part of each of said spindle means and located between said portions for spacing said rewind film take-up reel and rewind film supply reel a predetermined distance laterally from the vertical axis of said lens in accordance with the projection angle of said lens.

References Cited by the Examiner

UNITED STATES PATENTS

| 1,843,650 | 2/1932 | Schlicker | 352—125 |
| 2,153,666 | 4/1939 | Hill et al. | 242—55.11 |
| 2,360,294 | 10/1944 | Wellman et al. | 242—55.11 |

FOREIGN PATENTS

| 513,873 | 2/1921 | France. |

MERVIN STEIN, *Primary Examiner.*